United States Patent
Hoshino

(10) Patent No.: US 10,972,143 B2
(45) Date of Patent: Apr. 6, 2021

(54) INFORMATION PROCESSING DEVICE AND INFORMATION PROCESSING PROGRAM

(71) Applicant: TOYOTA JIDOSHA KABUSHIKI KAISHA, Toyota (JP)

(72) Inventor: Akira Hoshino, Nagoya (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 16/806,212

(22) Filed: Mar. 2, 2020

(65) Prior Publication Data
US 2020/0343923 A1  Oct. 29, 2020

(30) Foreign Application Priority Data

Apr. 24, 2019 (JP) .............................. JP2019-083100

(51) Int. Cl.
| | | |
|---|---|---|
| *H04B 1/3822* | (2015.01) | |
| *B60R 25/24* | (2013.01) | |
| *B60R 25/20* | (2013.01) | |

(52) U.S. Cl.
CPC .......... *H04B 1/3822* (2013.01); *B60R 25/209* (2013.01); *B60R 25/24* (2013.01)

(58) Field of Classification Search
CPC ............................. H04B 1/3822; B60R 25/209
See application file for complete search history.

(56) References Cited

U.S. PATENT DOCUMENTS

| | | | |
|---|---|---|---|
| 6,751,475 B1* | 6/2004 | Holmes ............... | H04M 1/6091 455/406 |
| 2002/0032510 A1* | 3/2002 | Turnbull .................. | H04R 1/08 701/49 |
| 2011/0057612 A1* | 3/2011 | Taguchi .................. | B60L 53/30 320/109 |
| 2015/0235487 A1* | 8/2015 | Proefke .................... | G07C 9/20 340/5.61 |
| 2018/0347531 A1 | 12/2018 | Tamane et al. | |

FOREIGN PATENT DOCUMENTS

| | | |
|---|---|---|
| JP | 2016-201613 A | 12/2016 |
| JP | 2018-204475 A | 12/2018 |

* cited by examiner

*Primary Examiner* — Hsinchun Liao
(74) *Attorney, Agent, or Firm* — Oliff PLC

(57) ABSTRACT

An information processing device is an information processing device (a DCM or a processing device) that is provided in a vehicle mounted with communication equipment or is provided in an external device (a center server) configured to perform communication with the communication equipment, and includes a storage unit configured to store association information in which equipment identification information unique to a DCM and vehicle identification information unique to an authorized vehicle mounted with the DCM are associated. With this configuration, it is possible to determine whether or not the DCM is mounted in an authorized vehicle using the stored association information, for example, by comparing the vehicle identification information of the authorized vehicle associated with the equipment identification information unique to the DCM with received vehicle identification information. For this reason, it is possible to specify the authorized vehicle mounted with the DCM.

5 Claims, 11 Drawing Sheets

FIG. 9

| Byte position | Bit position | | | | | | | |
|---|---|---|---|---|---|---|---|---|
| | 7 | 6 | 5 | 4 | 3 | 2 | 1 | 0 |
| 0 | File Type ||||||||
| 1 TO 17 | VIN ||||||||
| 18 | DCM Model Year ||||||||
| 19 | DCM Destination ||||||||
| 20 | Country Code ||||||||
| 21 | Country Code | | | 0 | 0 | 0 | 0 |
| 22 TO 23 | Destination Package ||||||||
| 24 | Destination Symbol ||||||||
| 15 TO 34 | DCM Part Number ||||||||
| 35 | DCM Supplier ||||||||
| 36 | DCM Grade ||||||||
| 37 TO 51 | IMEI ||||||||
| 52 TO 83 | eUICC ID ||||||||
| 84 TO 100 | Vehicle Unit Terminal Serial Number ||||||||

INFORMATION PROCESSING DEVICE AND INFORMATION PROCESSING PROGRAM

INCORPORATION BY REFERENCE

The disclosure of Japanese Patent Application No. 2019-083100 filed on Apr. 24, 2019 including the specification, drawings and abstract is incorporated herein by reference in its entirety.

BACKGROUND

1. Technical Field

The present disclosure relates to an information processing device and an information processing program.

2. Description of Related Art

A form in which communication is performed between a vehicle and an external device (server or the like) of the vehicle is hitherto known. For example, Japanese Unexamined Patent Application Publication No. 2016-201613 (JP 2016-201613 A) discloses a technique in which, in a case where a remote operation request of a vehicle is transmitted from a portable terminal to a telematics center as an external device, a remote operation command is transmitted from the telematics center toward communication equipment mounted in the vehicle.

SUMMARY

However, in the related art disclosed in JP 2016-201613 A, in effect, there is a possibility that communication is established solely between communication equipment mounted in a specific vehicle and an external device. For example, in a case where communication equipment mounted in a first vehicle among a plurality of vehicles is demounted, and communication equipment mounted in a second vehicle other than the first vehicle is replaced in an unauthorized manner, vehicle information transmitted from the communication equipment replaced in the first vehicle is uploaded to the external device according to an instruction from the external device. Thus, there is a possibility that the first vehicle, in which the authorized communication equipment is mounted, cannot be specified. Furthermore, since there is a possibility that the first vehicle is remotely operated in an unauthorized manner with the communication equipment replaced in an unauthorized manner, there is room for improvement from a viewpoint of crime prevention.

The disclosure provides a technique for specifying an authorized vehicle in which communication equipment is mounted.

An aspect of the disclosure relates to an information processing device that is provided in a vehicle mounted with communication equipment or is provided in an external device configured to perform communication with the communication equipment. The information processing device includes a storage unit. The storage unit is configured to store association information in which equipment identification information unique to the communication equipment and vehicle identification information unique to the authorized vehicle mounted with the communication equipment are associated.

According to the aspect, as the stored association information is used, it is possible to specify the authorized vehicle mounted with the communication equipment. In a case where it is not possible to specify the authorized vehicle mounted with the communication equipment, there is a probability that a situation in which the communication equipment is not mounted in the authorized vehicle occurs. Thus, it is possible to take measures for an unauthorized use of the authorized vehicle with respect to the remote operation request or the like.

The information processing device according to the aspect of the disclosure may further include an information transmission restriction unit configured to compare the vehicle identification information acquired from the vehicle with the vehicle identification information included in the association information, and in a case where the vehicle identification information acquired from the vehicle does not coincide with the vehicle identification information included in the association information, restrict transmission of vehicle status information representing a status of the vehicle to the external device.

According to the aspect, for example, even though the communication equipment mounted in the vehicle is replaced in an unauthorized manner or the like, and communication equipment other than authorized communication equipment is mounted in the authorized vehicle, the vehicle identification information is non-coincident, whereby it is possible to restrict transmission of the vehicle status information or the like to the center server. With this, for example, it is possible to restrain the status of the vehicle from being known to a user who is going to use the vehicle in an unauthorized manner.

The information processing device according to the first aspect of the disclosure may further include an information discard unit configured to compare the vehicle identification information acquired from the vehicle with the vehicle identification information included in the association information, and in a case where the vehicle identification information acquired from the vehicle does not coincide with the vehicle identification information included in the association information, discard information transmitted from the external device.

According to the aspect, even though the communication equipment mounted in the vehicle is replaced in an unauthorized manner or the like, and communication equipment other than authorized communication equipment is mounted in the authorized vehicle, the remote operation request transmitted from the portable terminal carried with the user who is going to perform the remote operation of the authorized vehicle is discarded. Thus, an unauthorized use of the vehicle is restrained.

Another aspect of the disclosure can be implemented as an information processing program.

According to the disclosure, it is possible to specify the authorized vehicle mounted with the communication equipment.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein:

FIG. 9 is a diagram showing an example of the association information;

FIG. 10 is a diagram conceptually showing a timing of uploading the association information and the like at the time of manufacturing of a vehicle, at the time of transportation of the vehicle, and the like.

DETAILED DESCRIPTION OF EMBODIMENTS

Figure 1:
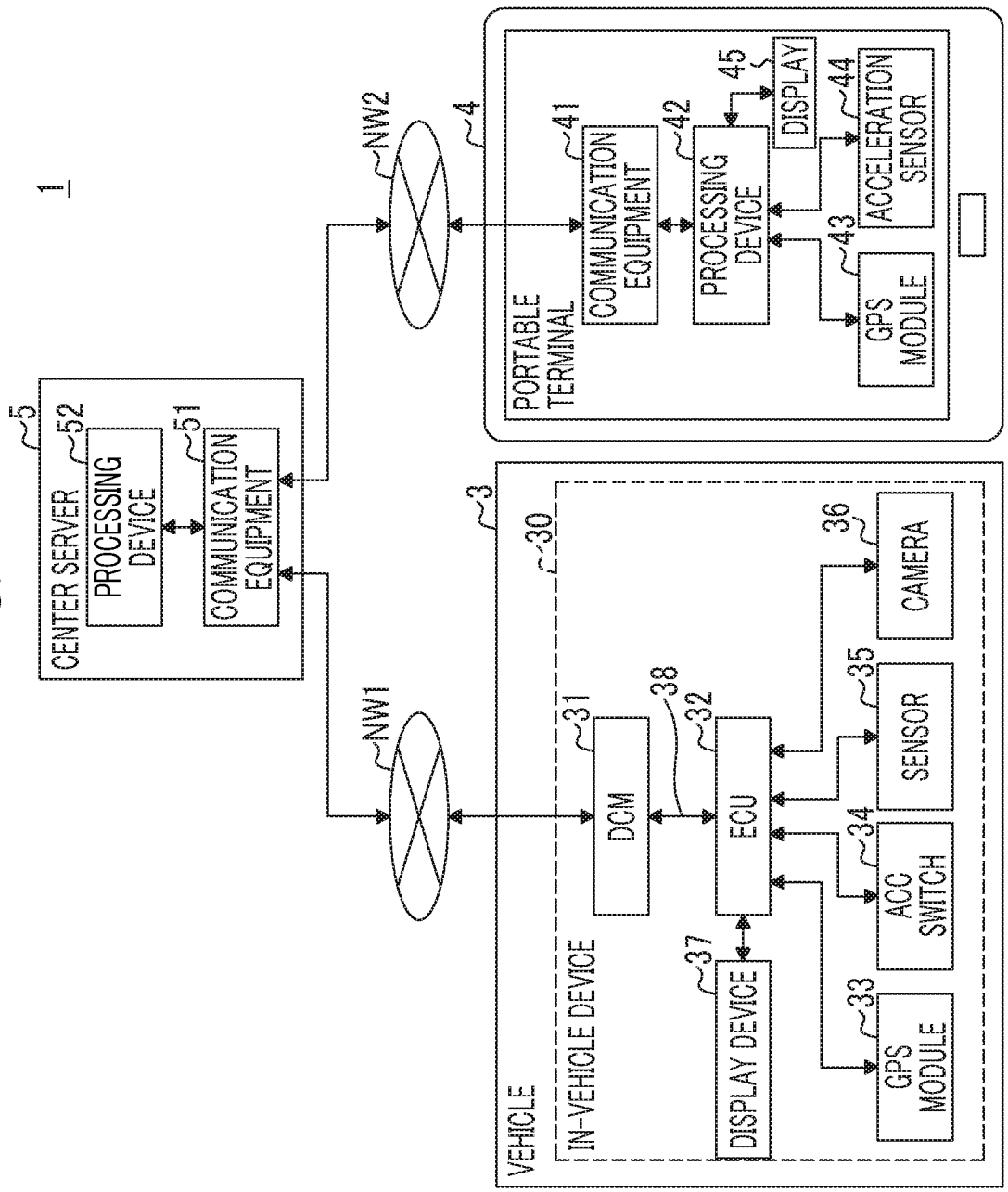
FIG. 1 is a diagram schematically showing the configuration of an information distribution system 1 including an information processing device according to an embodiment of the disclosure.

Hereinafter, a mode for carrying out the disclosure will be described referring to the drawings.

FIG. 1 is a diagram schematically showing the configuration of an information distribution system 1 including an information processing device according to an embodiment of the disclosure. The information processing device is a data communication module (DCM) 31, a processing device 52 in a center server 5, or the like shown in FIG. 1.

The information distribution system 1 includes an in-vehicle device 30 mounted in a vehicle 3, a portable terminal 4, and a center server 5 that is able to perform communication with the in-vehicle device 30 and the portable terminal 4. Hereinafter, the vehicle 3 may be simply referred to a "vehicle" or an "automobile". The vehicle is not limited to a passenger vehicle, and may be a freight vehicle, a shared vehicle (for example, a bus), or the like.

The in-vehicle device 30 includes the DCM 31 as an example of the information processing device, an electronic control unit (ECU) 32, a global positioning system (GPS) module 33, an ACC switch 34, a sensor 35, a camera 36, a display device 37, and the like. In the vehicle 3, for example, a navigation device, an audio device, an inverter, a motor, accessories, and the like are also mounted in addition to the in-vehicle device 30. The accessories include an air conditioner, a radiator fan, a rear defogger, and the like.

The DCM 31 is communication equipment that performs communication with the center server 5 through a communication network NW1 in both directions. The communication network NW1 is, for example, a mobile phone network with multiple base stations as terminals, a satellite communication network using communication satellites, or the like. The DCM 31 is connected to perform communication with the ECU 32 through a controller area network (CAN) 38 as an in-vehicle network to transmit various kinds of information to the outside of the vehicle 3 according to a request from the ECU 32 and to input information received from the outside of the vehicle 3 to the ECU 32.

The ECU 32 is an electronic control unit that executes various kinds of control processing relating to predetermined functions in the vehicle 3, and is, for example, a motor ECU, a hybrid ECU, an engine ECU, and the like. For example, the ECU 32 collects vehicle information and inputs the vehicle information to the DCM 31. The vehicle information is, for example, information relating to the status of the vehicle 3, imaging information, and the like. Information relating to the status of the vehicle 3 is, for example, detection information detected by various sensors, such as the GPS module 33 and the ACC switch 34. The imaging information is imaging data captured by the camera 36, time information indicating a time when imaging data is captured, and the like.

The GPS module 33 receives GPS signals transmitted from the satellites and measures a position of the vehicle 3 in which the GPS module 33 is mounted. The GPS module 33 is connected to perform communication with the ECU 32 through the CAN 38, and measured positional information of the vehicle 3 is input to the ECU 32.

The ACC switch 34 turns on or off an accessory power supply of the vehicle 3 according to a predetermined operation of an occupant, such as a driver of the vehicle 3. For example, the ACC switch 34 is turned on or off according to an operation on a power switch provided in an instrument panel near a steering wheel of a driver's seat in the vehicle cabin, that is, a button type switch for operating the ACC switch 34 and an ignition switch (IG switch) (not shown). An output signal of the ACC switch 34 is an example of information representing the start and the stop of the vehicle 3. Specifically, in a case where the output signal of the ACC switch 34 is switched from an OFF signal to an ON signal, this represents the start of the vehicle 3, and in a case where the output signal of the ACC switch 34 is switched from the ON signal to the OFF signal, this represents the stop of the vehicle 3. The ACC switch 34 is connected to perform communication with the ECU 32 and the like through the CAN 38, and a state signal (the ON signal or the OFF signal) of the ACC switch 34 is input to the ECU 32.

The sensor 35 includes a voltage sensor that detects a voltage input to the inverter, a voltage sensor that detects a voltage input to the motor, a speed sensor that detects a vehicle speed, an accelerator sensor that detects an accelerator operation amount, a brake sensor that detects a brake operation amount, an accelerator pedal sensor that detects an operation status of an accelerator pedal of the vehicle 3, a brake pedal sensor that detects an operation status of a brake pedal, a steering sensor that detects an operation status of a steering wheel, and the like. The sensor 35 may include, for example, an acceleration sensor that detects an acceleration of the vehicle 3, an angular velocity sensor (a gyro sensor) that detects an angular velocity of the vehicle 3, and the like. Detection information output from the sensor 35 is loaded in the ECU 32 through the CAN 38.

The camera 36 is, for example, an imaging unit that images a predetermined imaging range, such as in front of or behind the vehicle 3 or the inside of a vehicle cabin.

The display device 37 is disposed at a position where an occupant, such as the driver of the vehicle 3, easily views, for example, in a center upper portion of the instrument panel inside the vehicle cabin, and displays various information screens, various operation screens, and the like under the control of the ECU 32. The display device 37 is, for example, a touch panel type liquid crystal display or the like.

The portable terminal 4 is, for example, a mobile phone, a smartphone, a notebook computer, a personal handy-phone system (PHS), or the like that can be carried with an occupant (a driver, a fellow passenger, or the like) of the vehicle 3. The portable terminal 4 performs communication with the center server 5 through a communication network NW2 based on a wireless communication standard, such as Global System for Mobile communications (GSM: Registered Trademark), Personal Digital Cellular (PDC), Code Division Multiple Access (CDMA), Long Term Evolution (LTE), or Worldwide Interoperability for Microwave Access (WiMAX). An occupant of the vehicle 3 may be referred to a "user" because the occupant can become a user of the portable terminal 4. The portable terminal 4 may perform short-distance wireless communication with the in-vehicle device 30 of the vehicle 3 according to a predetermined wireless communication standard. The short-distance wireless communication includes Bluetooth (Registered Trademark), a wireless local area network (LAN), or the like.

The portable terminal 4 includes communication equipment 41, a processing device 42, a GPS module 43, an acceleration sensor 44, and a display 45.

The communication equipment 41 is a device that performs communication with the center server 5 through the communication network NW2 in both directions under the control of the processing device 42. The communication network NW2 is a mobile communication network with multiple base stations as terminals, a satellite communication network using communication satellites, or the like. For example, the communication equipment 41 is a mobile communication module corresponding to a predetermined communication standard, such as Long Term Evolution (LTE) or 4th Generation (4G), or 5th Generation (5G).

The processing device 42 executes various kinds of control processing in the portable terminal 4.

The GPS module 43 receives GPS signals transmitted from the satellites and measures a position of the portable terminal 4 in which the GPS module 43 is mounted. Measured positional information of the portable terminal 4 is input to the processing device 42. The positional information may be acquired by base station positioning based on exchange of signals with the base stations instead of or in addition to GPS positioning using the GPS module 43.

The acceleration sensor 44 is, for example, a known detection unit that detects an acceleration of the portable terminal 4 using a micro electro mechanical system (MEMS) technique.

The display 45 is, for example, a display device, such as a liquid crystal display (LCD) or an organic electroluminescence (EL) display.

The center server 5 is a server that collects information from a plurality of vehicles 3 and performs information distribution to the vehicles 3 and the users of a plurality of portable terminals 4 to provide various services. Various services include, for example, a car-sharing service, an authentication key service, a trunk delivery service, a B2C car-share service, and the like.

The center server 5 includes communication equipment 51 and a processing device 52.

The communication equipment 51 is a communication device that performs communication with the vehicles 3 and the portable terminals 4 through the communication network NW1 and the communication network NW2, respectively, in both directions under the control of the processing device 52.

The processing device 52 executes various kinds of control processing in the center server 5. The processing device 52 is constituted of, for example, a server computer including a central processing unit (CPU), a random access memory (RAM), a read only memory (ROM), an auxiliary storage device, an input/output interface, and the like.

Next, the hardware configuration of the ECU 32 of the in-vehicle device 30 will be described referring to FIG. 2.

Figure 2:
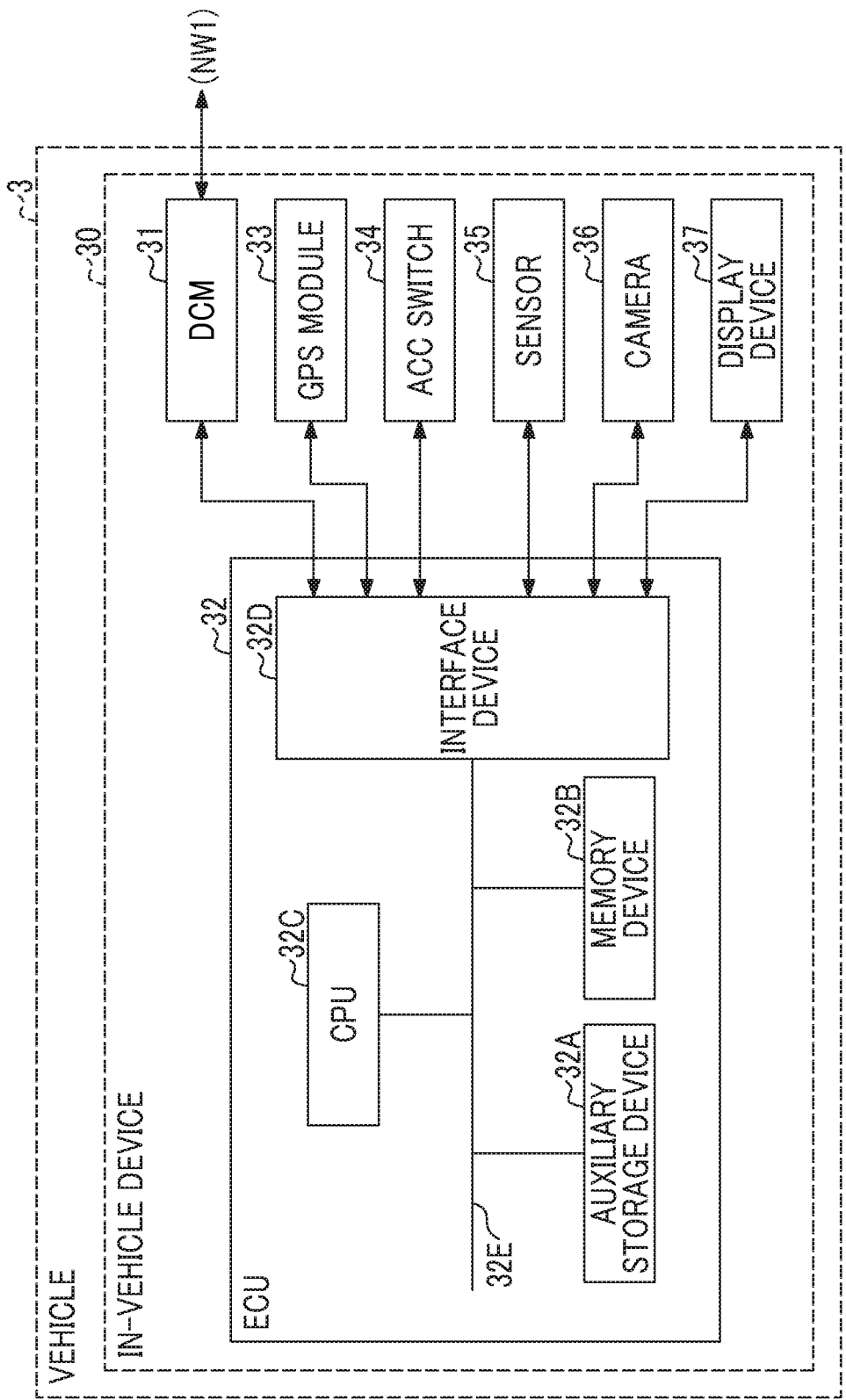
FIG. 2 is a diagram showing a hardware configuration example of an ECU 32 of an in-vehicle device 30.

FIG. 2 is a diagram showing a hardware configuration example of the ECU 32 of the in-vehicle device 30. The ECU 32 includes an auxiliary storage device 32A, memory device 32B, a CPU 32C, and an interface device 32D. The auxiliary storage device 32A, the memory device 32B, the CPU 32C, and the interface device 32D are connected to one another through a busline 32E.

A program that implements various functions of the ECU 32 is provided by, for example, a dedicated tool through a cable that is attachable to and detachable from a predetermined connector for external connection leading to the CAN 38, for example, a data link coupler (DLC). The program is installed in the auxiliary storage device 32A of the ECU 32 by way of the cable, the connector, and the in-vehicle network from the dedicated tool according to a predetermined operation in the dedicated tool. The program may be downloaded from another computer through the communication network NW1 and may be installed in the auxiliary storage device 32A.

The auxiliary storage device 32A is a hard disk drive (HDD), a flash memory, or the like that stores the installed program and stores needed files, data, and the like.

The memory device 32B reads the program from the auxiliary storage device 32A and stores the program in a case where a start instruction of the program is issued.

The CPU 32C executes the program stored in the memory device 32B and implements various functions of the ECU 32 according to the program.

The interface device 32D is, for example, an interface that connects the CPU 32C to the DCM 31 through the CAN 38 and connects the display device 37, the camera 36, the sensor 35, and the like to the DCM 31 through the CAN 38.

Next, a hardware configuration example and a processing function of the processing device 42 of the portable terminal 4 will be described referring to FIG. 3.

Figure 3:
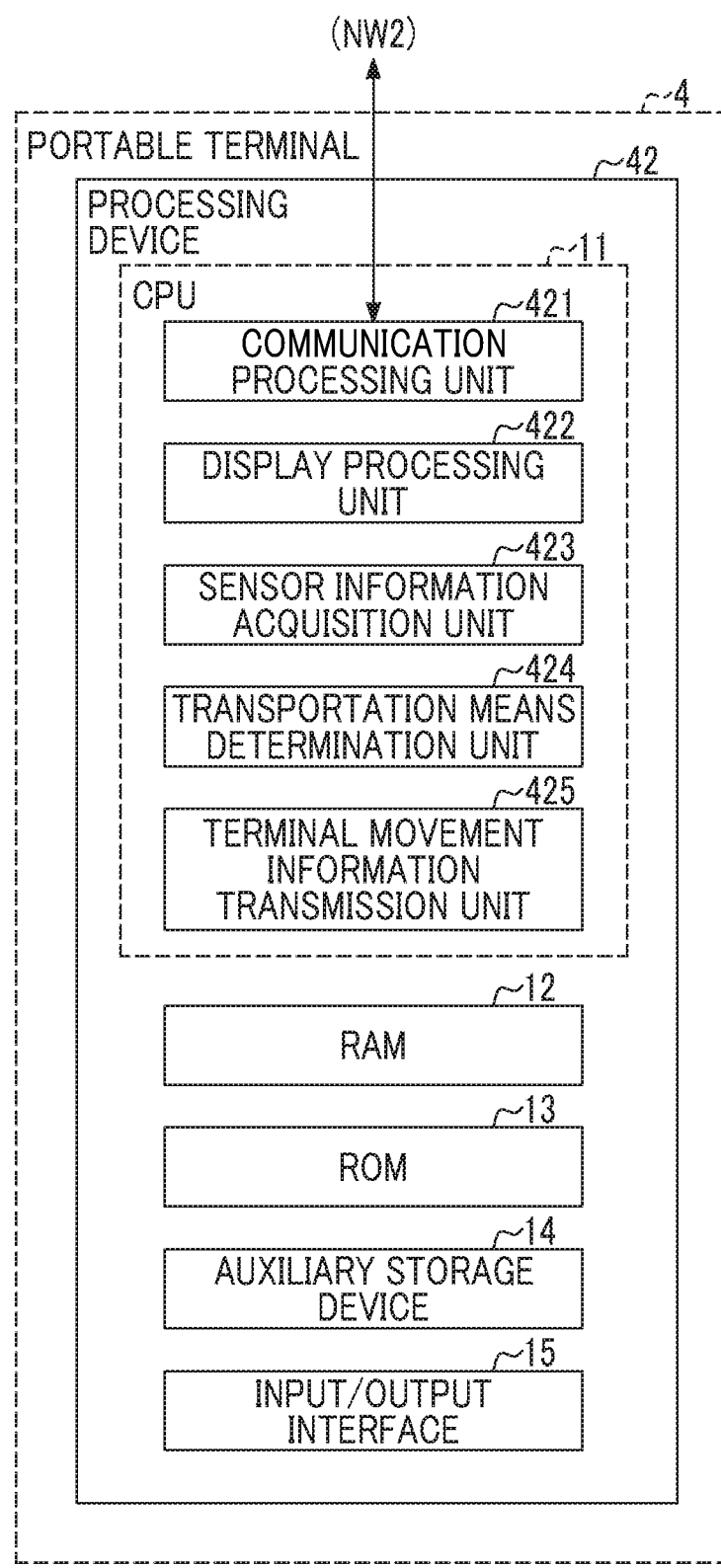
FIG. 3 is a diagram showing a hardware configuration example and a configuration example of a processing function of a processing device 42 of a portable terminal 4.

FIG. 3 is a diagram showing a hardware configuration example and a configuration example of the processing function of the processing device 42 of the portable terminal 4. The processing device 42 includes a CPU 11, a RAM 12, a ROM 13, an auxiliary storage device 14, and an input/output interface 15.

The CPU 11 includes a communication processing unit 421, a display processing unit 422, a sensor information acquisition unit 423, a transportation means determination unit 424, and a terminal movement information transmission unit 425. The functions are implemented by the CPU 11 executing a program stored in the ROM 13 or the auxiliary storage device 14.

The communication processing unit 421 performs control such that the communication equipment 41 performs transmission and reception of various signals with the center server 5.

The display processing unit 422 makes the display 45 display various images. For example, the display processing unit 422 makes the display 45 display various graphical user interfaces (GUI) as operation screens. For example, the display processing unit 422 makes the display 45 display various kinds of information distributed from the center server 5.

The sensor information acquisition unit 423 acquires sensor information input from various sensors, such as the GPS module 43, from a buffer in the RAM or the like. Specifically, the sensor information acquisition unit 423 acquires the positional information of the portable terminal 4 input from the GPS module 43. The sensor information acquisition unit 423 acquires information (acceleration information) relating to the acceleration of the portable terminal 4 input from the acceleration sensor 44.

The transportation means determination unit 424 determines whether the user who carries the portable terminal 4 is moving on a vehicle (hereinafter, referred to as a "vehicle as transportation mean") excluding a public transport (bus) as transportation means or is moving on other transportation means (for example, walking, a bicycle, a train, a bus, or the like). For example, the transportation means determination unit 424 may perform the determination by applying a discriminator machine-learned in advance to discriminate between a case where the user is moving on the vehicle as transportation means and a case where the user is moving on transportation means other than the vehicle based on the acceleration information input from the acceleration sensor 44. For example, the transportation means determination unit 424 may determine whether the user is moving on the vehicle as transportation means or is moving on transportation means other than the vehicle based on the positional information of the portable terminal 4 input from the GPS module 43 in addition to or instead of the acceleration information input from the acceleration sensor 44.

In the public transport in the embodiment, a taxi is not included. That is, the taxi may be included in the vehicle excluding the public transport. The transportation means determination unit 424 may simply determine whether the user of the portable terminal 4 is moving on a vehicle including the public transport (bus) as transportation means or is moving on other transportation means. With this, for example, the transportation means determination unit 424 merely determines a movement speed of the portable terminal 4 and whether or not the portable terminal 4 is moving on rails, thereby being able to determine whether the user who carries the portable terminal 4 is moving on the vehicle including the public transport as transportation means or is moving on other transportation means.

The terminal movement information transmission unit 425 generates information (terminal movement information) relating to the movement of the portable terminal 4, that is, the movement of the user who carries the portable terminal 4 and transmits the generated information to the center server 5 through the communication processing unit 421. In the terminal movement information, the positional information of the portable terminal 4, a determination result (the presence or absence of a vehicle movement tag described below) of the transportation means determination unit 424, and the like may be included.

Next, a processing function of the ECU 32 of the in-vehicle device 30 will be described referring to FIG. 4.

Figure 4:
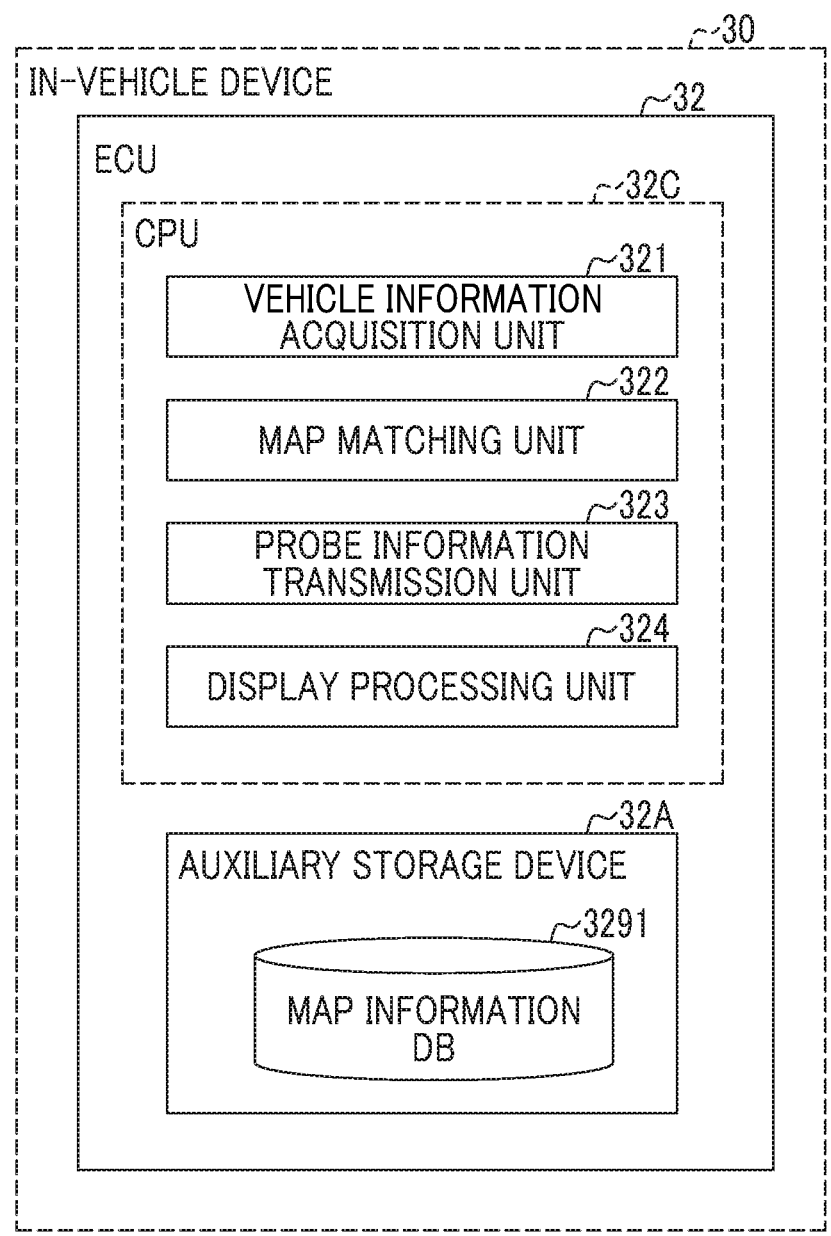
FIG. 4 is a diagram showing a configuration example of a processing function of the ECU 32 of the in-vehicle device 30.

FIG. 4 is a diagram showing a configuration example of the processing function of the ECU 32 of the in-vehicle device 30. The CPU 32C of the ECU 32 includes a vehicle information acquisition unit 321, a map matching unit 322, a probe information transmission unit 323, and a display processing unit 324. The functions are implemented by the CPU 32C executing the program stored in the memory device 32B or the auxiliary storage device 32A shown in FIG. 2. In the auxiliary storage device 32A, for example, a map information database (DB) 3291 is included. The map information DB 3291 is constituted of geographic information system (GIS) data or the like including nodes corresponding to intersections, road links connecting the nodes, lines or polygons corresponding to features, such as buildings and roads, and the like.

The vehicle information acquisition unit 321 acquires the vehicle information input from the GPS module 33, the ACC switch 34, the sensor 35, the camera 36, and the like shown in FIG. 1 from a buffer in the RAM or the like. Specifically, the vehicle information acquisition unit 321 acquires the positional information of the vehicle 3 input from the GPS module 33. The vehicle information acquisition unit 321 acquires a signal (the ON signal or the OFF signal) relating to an ON or OFF state of the ACC switch 34 input from the ACC switch 34. The vehicle information acquisition unit 321 acquires information (vehicle speed information) relating to the vehicle speed of the vehicle 3 input from the sensor 35. The vehicle information acquisition unit 321 acquires a captured image input from the camera 36.

The map matching unit 322 specifies a road link corresponding to the positional information of the vehicle 3, that is, a road link where the vehicle 3 is currently positioned based on the map information DB 3291 and the positional information of the vehicle 3 acquired by the vehicle information acquisition unit 321. For example, identification information, that is, a link ID (identifier) is defined in advance to each of a plurality of road links constituting a road network included in the map information DB 3291, and the map matching unit 322 specifies the link ID of the road link where the vehicle 3 is currently positioned.

The function of the map matching unit 322 may be provided in the center server 5. In this case, the center server 5 may specify the link ID of the road link where each vehicle 3 is currently positioned based on the positional information included in probe information described below transmitted from the vehicle 3.

The probe information transmission unit 323 generates the probe information including various kinds of vehicle information acquired by the vehicle information acquisition unit 321, time information corresponding to various kinds of vehicle information, the road link specified by the map matching unit 322, and the like in every predetermined cycle. Then, the probe information transmission unit 323 transmits the generated probe information to the center server 5 through the DCM 31.

In the probe information that is transmitted from the vehicle 3 to the center server 5, the time information corresponding to various kinds of vehicle information may not be included. In this case, the center server 5 may add or the like a time at which the vehicle movement information is transmitted from the vehicle 3, a time at which the vehicle movement information is received by the center server 5, an estimated time, at which the vehicle 3 is present at an actual position corresponding to the positional information, calculated from the above-described time, or the like as the time information corresponding to various kinds of vehicle information to the probe information received from the vehicle 3.

The display processing unit 324 executes processing for making the display device 37 display a predetermined information screen according to an operation of the occupant, such as the driver of the vehicle 3, or the like. For example, the display processing unit 324 executes processing for making the display device 37 display various kinds of information distributed from the center server 5 to the vehicle 3.

Next, a hardware configuration example and a configuration example of a processing function of the processing device 52 of the center server 5 will be described referring to FIG. 5.

Figure 5:
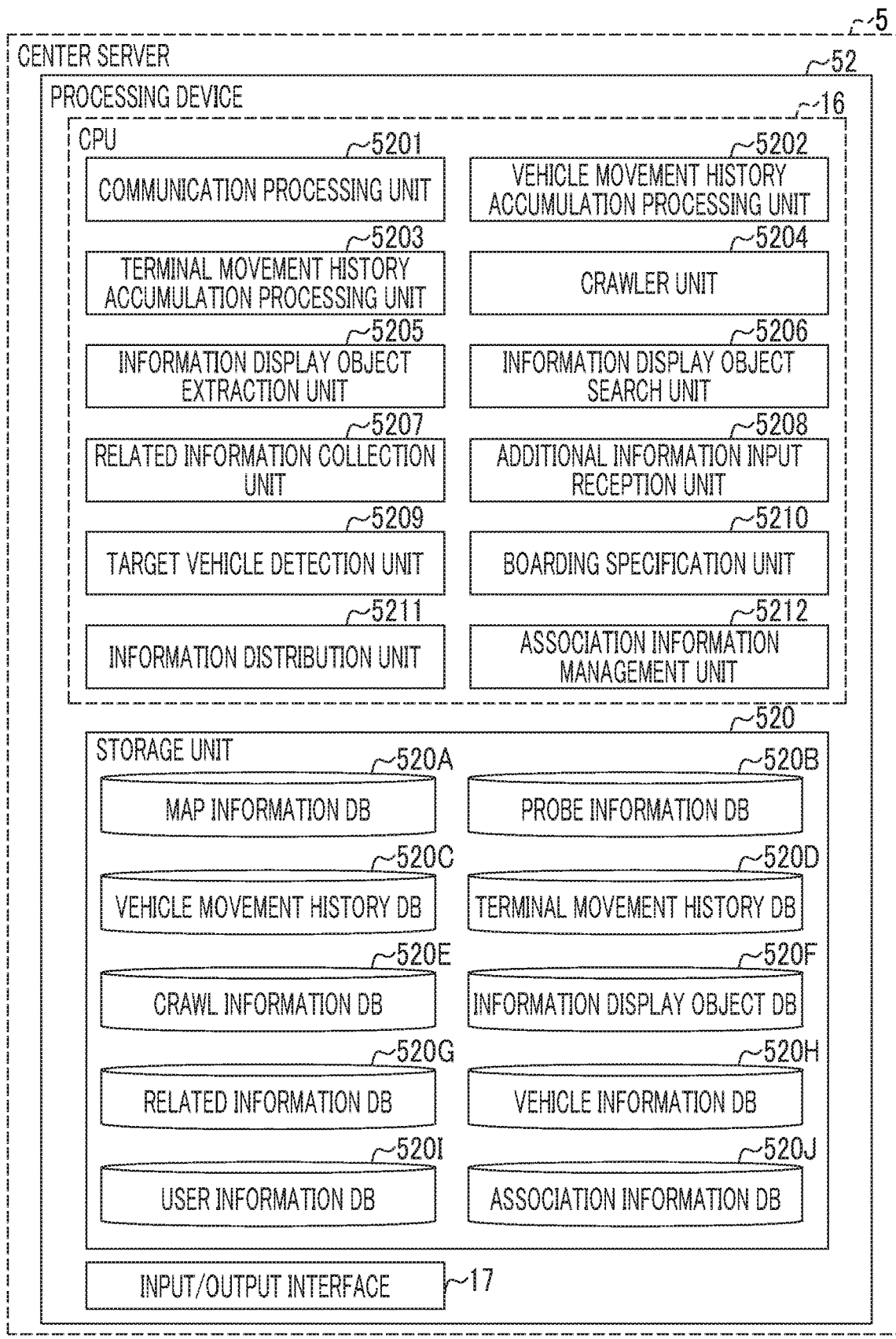
FIG. 5 is a diagram showing a hardware configuration example and a configuration example of a processing function of a processing device 52 of a center server 5.

FIG. 5 is a diagram showing a hardware configuration example and a configuration example of a processing function of the processing device 52 of the center server 5. The processing device 52 includes a CPU 16, a storage unit 520, and an input/output interface 17.

The CPU 16 includes a communication processing unit 5201, a vehicle movement history accumulation processing unit 5202, a terminal movement history accumulation processing unit 5203, a crawler unit 5204, an information display object extraction unit 5205, an information display object search unit 5206, a related information collection unit 5207, an additional information input reception unit 5208, a target vehicle detection unit 5209, a boarding specification unit 5210, an information distribution unit 5211, and an association information management unit 5212. The functions are implemented by the CPU 16 executing a program stored in the storage unit 520.

The storage unit 520 includes a map information DB 520A, a probe information DB 520B, a vehicle movement history DB 520C, a terminal movement history DB 520D, a crawl information DB 520E, an information display object DB 520F, a related information DB 520G, a vehicle information DB 520H, a user information DB 520I, and an association information DB 520J.

The communication processing unit 5201 performs control such that the communication equipment 51 performs transmission and reception of various signals (control signals, information signals, and the like) with the vehicles 3 and the portable terminals.

The vehicle movement history accumulation processing unit 5202 executes processing for processing the probe information that is successively received from the vehicles 3 by the communication processing unit 5201 and is saved in the probe information DB 520B and making the vehicle movement history DB 520C accumulate the probe information as a movement history (vehicle movement history) of the vehicle 3. For example, the vehicle movement history accumulation processing unit 5202 generates information (trip information) relating to the movement history for each period from the start to the stop of each vehicle 3, that is, for each trip based on time-series data of the probe information of the vehicles 3 stored in the probe information DB 520B. In other words, the vehicle movement history accumulation processing unit 5202 generates trip information from a departure place to a destination for each trip of the vehicle 3. Specifically, the vehicle movement history accumulation processing unit 5202 determines the start of the vehicle 3 based on the signal of the ACC switch 34 included in time-series data of the probe information and defines the positional information included in the probe information at the time of the start of the vehicle 3 as a start point (departure place) of one trip of the vehicle 3. The vehicle movement history accumulation processing unit 5202 defines the positional information of the vehicle 3 included in the last probe information including the OFF signal of the ACC switch 34 among the probe information later than the probe information of the vehicle 3 in a time series as an end point (destination) of the trip of the vehicle 3.

Then, the vehicle movement history accumulation processing unit 5202 combines the two pieces of probe information related to both the start point and the end point of one trip of the vehicle 3 and a plurality of pieces of probe information (probe information group) between the two pieces of probe information in a time series to generates the trip information. The vehicle movement history accumulation processing unit 5202 saves the generated trip information of each vehicle 3 in the vehicle movement history DB 520C in association with identification information (vehicle identification number: vehicle index number (VIN), a predetermined vehicle ID, or the like) corresponding to the vehicle 3.

The processing in the vehicle movement history accumulation processing unit 5202 may be executed in real time corresponding to the probe information successively received from the vehicles 3 by the communication processing unit 5201 or may be executed on non-processed probe information collected to a certain extent at regular intervals.

The terminal movement history accumulation processing unit 5203 executes processing for making the terminal movement history DB 520D accumulate the terminal movement information successively received from the portable terminals 4 by the communication processing unit 5201 as a movement history of the portable terminal 4. Specifically, the terminal movement history accumulation processing unit 5203 saves the terminal movement information of each portable terminal 4 in the terminal movement history DB 520D in a form of being associated with identification information corresponding to each portable terminal 4, for example, a predetermined terminal ID or the like.

The processing in the terminal movement history accumulation processing unit 5203 may be executed in real time corresponding to the terminal movement information successively received from the portable terminals 4 by the communication processing unit 5201 or may be executed on non-processed terminal movement information collected to a certain extent in a buffer of the RAM or the like at regular intervals.

The crawler unit 5204 collects (downloads) information from web sites on the Internet or SNS based on a known algorithm at regular intervals and saves the collected information in the crawl information DB 520E.

The information display object extraction unit 5205 extracts an information display object from captured images of the camera 36 included in the probe information of the vehicles 3 stored in the probe information DB 520B based on known image recognition processing. Then, the information display object extraction unit 5205 attaches unique identification information to the extracted information display object and saves the identification information in the information display object DB 520F in association with an image of the information display object and meta information, such as positional information of the information display object. With this, in the information display object DB 520F, in addition to information relating to information display objects registered in advance, such as a standing signboard, on which advertisement information of an advertiser is displayed, and a digital signage, information relating to the information display object extracted by the information display object extraction unit 5205 is registered. For this reason, since the information display objects to be a target of distribution of related information described below are advanced, user's convenience is improved.

The positional information of the information display object attached as the meta information may be the positional information of the vehicle 3 included in the same probe information as the captured image as an extraction source at it is or may be positional information in consideration of relative positional information of the information display object with respect to the vehicle 3 calculated from the captured image. In a case where determination is made that the extracted information display object is the same as an information display object already registered in the information display object DB 520F, the information display object extraction unit 5205 does not save information relating to the extracted information display object in the information display object DB 520F. The processing in the information display object extraction unit 5205 may be executed in real time corresponding to the probe information successively received from the vehicles 3 by the communication processing unit 5201 or may be executed on non-processed probe information collected to a certain extent at regular intervals.

The information display object search unit 5206 searches for information relating to an information display object, the position of which can be specified, from crawl information of the web or an SNS stored in the crawl information DB 520E. The information display object search unit 5206 attaches unique identification information to an information display object found as a result of the search and saves the identification information in the information display object DB 520F in association with an image of the information display object, meta information, such as positional information of the information display object.

In a case where determination is made that the extracted information display object is the same as an information display object already registered in the information display object DB 520F, the information display object search unit 5206 does not save information relating to the extracted information display object in the information display object DB 520F. The processing in the information display object search unit 5206 may be executed in real time corresponding to update of the crawl information DB 520E by the crawler unit 5204 or may be executed on crawl information collected to a certain extent at regular intervals.

The related information collection unit 5207 collects related information of the information display object registered in the information display object DB 520F from an image of the information display object extracted by the information display object extraction unit 5205 or crawl information of a web or an SNS stored in the crawl information DB 520E. In the related information of the information display object, contents of information displayed on the information display object and collected based on an image of the information display object and the like are included. In the related information of the information display object, positional information including route guidance information for a place, a facility, or the like related to information displayed on the information display object, for example, positional information for a store, a facility, or the like, to which people are to be guided by advertisement information displayed on the information display object, is included. In the related information of the information display object, additional information, such as information more specifically indicating information displayed on the information display object, supplementary information for supplementing information displayed on the information display object, newer latest information (for example, information that can be updated in a time series, such as receipt-of-goods information or sale information of commodities or the like related to advertisement information of a certain store) related to information displayed on the information display object, and word-of-mouth information related to information displayed on the information display object, is included. The related information collection unit 5207 saves the collected related information and information relating to registration date and time in the related information DB 520G in association with the identification information of the corresponding information display object. With this, as described below, since it is possible to advance the related information of the information display object distributed to the vehicle 3, the portable terminal 4, or the like of the user, it is possible to improve user's convenience.

The processing in the related information collection unit 5207 may be executed in real time corresponding to the extraction processing of the information display object in the information display object extraction unit 5205 or the update processing of the crawl information DB 520E in the crawler unit 5204 or may be executed on an image of the extracted information display object or crawl information collected to a certain extent at regular intervals.

The additional information input reception unit 5208 receives additional information relating to the information display object registered in the information display object DB 520F, which is input through an input device of the processing device 52, the Internet, or the like. The additional information input reception unit 5208 saves the received additional information and information relating to the registration date and time as the related information of the corresponding information display object in the related information DB 520G in association with the identification information of the information display object. For example, a manager of the center server 5, an advertiser of the advertisement information displayed on the information display object, or the like can input additional information relating to an information display object already registered in the information display object DB 520F through a predetermined input device (not shown) connected to the processing device 52 or a predetermined web page. With this, as described below, since the related information of the information display object distributed to the vehicle 3, the portable terminal 4, or the like of the user is advanced, it is possible to improve user's convenience.

The target vehicle detection unit 5209 detects the vehicle 3 (target vehicle) positioned around the information display object registered in the information display object DB 520F based on the positional information included in the latest probe information received from the vehicles 3 by the communication processing unit 5201. Specifically, the target vehicle detection unit 5209 detects the vehicle 3 positioned on a road adjacent to the installation position of each information display object registered in the information display object DB 520F, that is, a road from which the information display object can be viewed from the vehicle 3 passing therethrough, such that a vehicle front faces the information display object.

The target vehicle detection unit 5209 determines whether or not the vehicle 3 has passed near the corresponding information display object (for example, in front of an information display object installed on a road side or below an information display object installed just above a road) based on positional information of the vehicle 3 as a target vehicle successively received by the communication processing unit 5201. That is, the target vehicle detection unit 5209 determines whether or not the vehicle 3 as a target vehicle has passed a section (hereinafter, referred to as a "visible section") where the information display object can be viewed on a road adjacent to the information display object. Usually, since an occupant of the vehicle 3 views an information display object in front of or beside the vehicle 3, in a case where the vehicle 3 has passed by an information display object on a road side or has passed below an information display object installed above a road, the occupant cannot view the information display object without looking back.

For example, on a premise that the center server 5 is connected to perform communication with an information display object, such as a digital signage, on which various kinds of information are displayed based on information distribution from the center server, the function of the target vehicle detection unit 5209 may be provided in the information display object (digital signage). In this case, the information display object may be configured to detect a target vehicle (vehicle 3) based on an output of a sensor, such as a camera, provided in the information display object and transmit a detection result to the center server 5.

The boarding specification unit 5210 specifies a user in the vehicle 3 (target vehicle) detected by the target vehicle detection unit 5209 based on the vehicle information DB 520H. In the vehicle information DB 520H, a portable terminal 4 of a user who uses each vehicle 3 is registered in association with each vehicle 3. With this, the boarding specification unit 5210 can specify the user of the portable terminal 4 registered in association with the vehicle 3 detected by the target vehicle detection unit 5209 as a user who is likely to be in the vehicle 3.

The boarding specification unit 5210 determines whether or not the user who is likely to be in the vehicle 3 as a target vehicle is actually in the vehicle 3. For example, the boarding specification unit 5210 compares positional information included in the latest terminal movement information of the portable terminal 4 of the user likely to be in the vehicle 3 received by the communication processing unit 5201 with the positional information included in the latest probe information of the vehicle 3 stored in the probe information DB 520B. With this, the boarding specification unit 5210 can determine whether or not the user of the portable terminal 4 is in the vehicle 3, and as a result, can specify the user who is in the vehicle 3.

Association information between the vehicle 3 and the portable terminal 4 registered in the vehicle information DB 520H may be defined through online registration processing of the user of the vehicle 3 and the portable terminal 4 by way of a predetermined web site. For example, the association information between the vehicle 3 and the portable terminal 4 stored in the vehicle information DB 520H may be defined by comparing a movement history (vehicle movement history) of the vehicle 3 stored in the vehicle movement history DB 520C with the movement history (terminal movement history) of the portable terminal 4 stored in the terminal movement history DB 520D. Specifically, in a case where trip information in a vehicle movement history of a vehicle 3 coincides with a part of a terminal movement history of a portable terminal 4, determination can be made that the user of the portable terminal 4 is in the vehicle 3. For this reason, the vehicle information DB 520H may be constructed by specifying the portable terminal 4 of the user who uses each vehicle 3 based on a boarding history (the number of times of boarding) of the vehicle 3.

In a case where the target vehicle detection unit 5209 determines that the target vehicle (vehicle 3) has passed near the corresponding information display object, the information distribution unit 5211 distributes the related information of the information display object to the vehicle 3 and the portable terminal 4 of the user in the vehicle 3 specified by the boarding specification unit 5210 through the communication processing unit 5201. With this, an occupant (user) in the vehicle 3 can confirm the related information of the information display object distributed to the vehicle 3 or the portable terminal 4 carried with the occupant through the display device 37 of the vehicle 3 or the display 45 of the portable terminal 4 in real time. For this reason, for example, even though the user in the vehicle 3 has missed an information display object or has not sufficiently ascertain information displayed on the information display object, since the related information of the information display object is provided, it is possible to prompt the user to ascertain information displayed on the information display object.

The information distribution unit 5211 may distribute the related information of the information display object to the portable terminal 4 of the user who is likely to be in the target vehicle (vehicle 3) detected by the target vehicle detection unit 5209, that is, the portable terminal 4 registered in the vehicle information DB 520H in association with the vehicle 3.

In a case where determination is made that the target vehicle (vehicle 3) detected by the target vehicle detection unit 5209 has passed near the corresponding information display object, the information distribution unit 5211 distributes the related information of the information display object to an account corresponding to the user in an online service (hereinafter, simply referred to as an online service), through which the user in the vehicle 3 or the user who is likely to be in the vehicle 3 is able to receive and read information, through the communication processing unit 5201. With this, the user in the vehicle 3 can confirm the related information of the information display object distributed to the user's account in an online service, such as a mailing service or an SNS service, to be used by the user later in a situation in which there is time to spare. In the user information DB 520I, for example, information relating to the account of the online service that is registered in advance by the user of the vehicle 3 or the portable terminal 4 through a predetermined web page or the like is registered in association with at least one of the vehicle 3 and the portable terminal 4. For this reason, the information distribution unit 5211 can determine that an account associated with the vehicle 3 detected by the target vehicle detection unit 5209 in the user information DB 520I is an account of the user who is likely to be in the vehicle 3. The information distribution unit 5211 can determine that an account associated with the portable terminal 4 of the user who is specified to be in the vehicle 3 by the boarding specification unit 5210 in the user information DB 520I is an account of the user in the vehicle 3.

The association information management unit 5212 stores the association information transmitted from the DCM 31 in the association information DB 520J. After the association information is stored in the association information DB 520J, in a case where a signal (an operation request signal, a remote operation request, or the like) for requesting a remote operation of a vehicle is input from the portable terminal 4, the association information management unit 5212 confirms whether or not the vehicle to be a target of a remote operation coincides with a vehicle recorded in the association information. The operation request signal is generated by, for example, an application program (dedicated application) for a vehicle remote operation installed in the portable terminal 4. Details of the association information management unit 5212 will be described below. A remote operation method of a vehicle using the portable terminal 4 or the like is well known as disclosed in, for example, Japanese Unexamined Patent Application Publication No. 2018-204475 (JP 2018-204475 A), and thus, description thereof will not be repeated.

Next, the hardware configuration of the DCM 31 of the in-vehicle device 30 will be described referring to FIG. 6.

Figure 6:
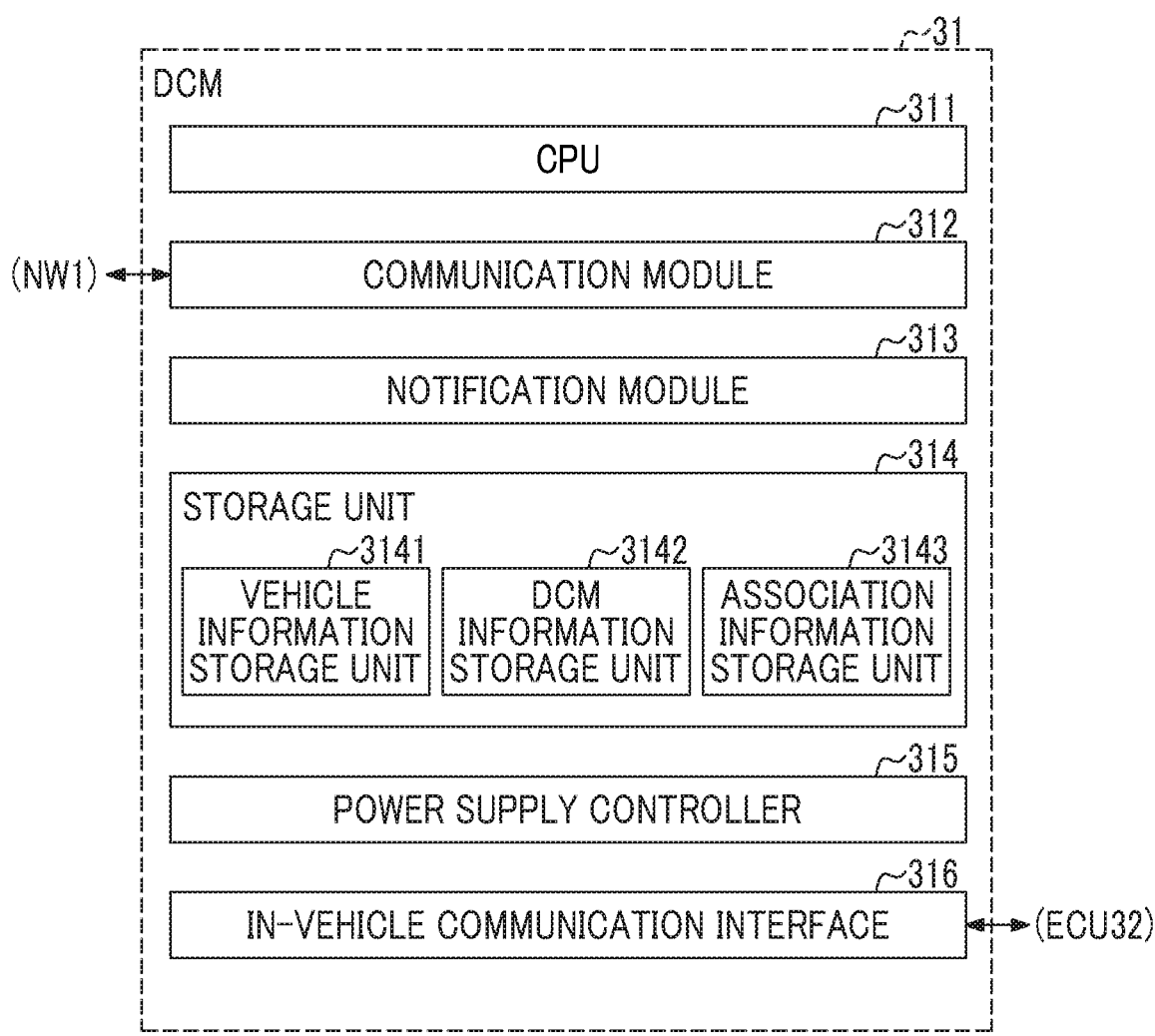
FIG. 6 is a diagram showing a hardware configuration example of a DCM 31.

FIG. 6 is a diagram showing a hardware configuration example of the DCM 31. The DCM 31 includes a CPU 311 that integrally manages the functions of the DCM 31, a communication module 312, a notification module 313, a storage unit 314, a power supply controller 315, and an in-vehicle communication interface 316.

The communication module 312 is communication equipment that is connected to the communication equipment 51 of the center server 5 through the communication network NW1 and performs voice call, high-speed data communication, and the like.

For example, the notification module 313 generates alarm information at the time of operation of an airbag, when an emergency notification switch is turned on, at the time of occurrence of a security alarm, or the like and gives an alarm to the center server 5 through the and communication module 312.

The storage unit 314 stores various kinds of information to be handled by the DCM 31, and includes a vehicle information storage unit 3141 that stores, for example, vehicle information, a DCM information storage unit 3142 that stores DCM information, and an association information storage unit 3143 that stores association information. Details of the association information will be described below.

The vehicle information described herein is vehicle identification information (for example, a VIN, a predetermined vehicle ID, or the like) for uniquely identifying a vehicle acquired from CAN data or the like of the vehicle. The DCM information is equipment identification information for uniquely identifying communication equipment, such as a DCM, mounted in a vehicle.

The power supply controller 315 is a power supply circuit that performs voltage drop control and constant voltage control on a power supply voltage supplied from an auxiliary battery to generate and supply power for driving the functions of the DCM 31.

The in-vehicle communication interface 316 performs transmission and reception of information in a given cycle with the ECU 32 through the CAN 38 in the vehicle.

Next, a processing function of the CPU 311 in the DCM 31 will be described referring to FIG. 7.

Figure 7:
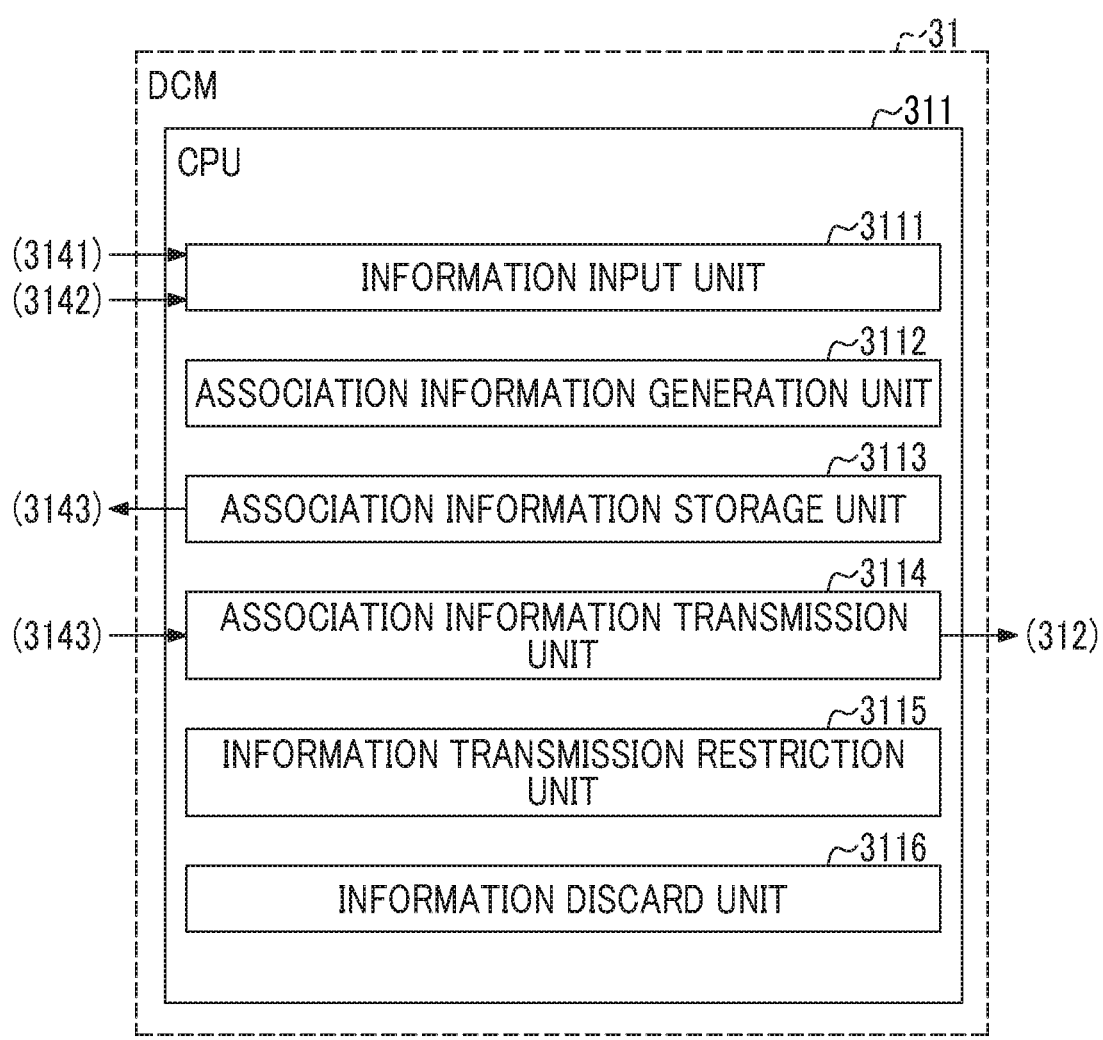
FIG. 7 is a diagram showing a configuration example of a processing function of a CPU 311 in the DCM 31.

FIG. 7 is a diagram showing a configuration example of the processing function of the CPU 311 in the DCM 31. The CPU 311 includes an information input unit 3111, an association information generation unit 3112, an association information storage unit 3113, an association information transmission unit 3114, an information transmission restriction unit 3115, and an information discard unit 3116. The functions are implemented by the CPU 311 executing a predetermined program stored in the storage unit 314 shown in FIG. 6.

The information input unit 3111 inputs the vehicle information stored in the vehicle information storage unit 3141 and the DCM information stored in the DCM information storage unit 3142 shown in FIG. 6.

The association information generation unit 3112 associates the vehicle information input to the information input unit 3111 with the DCM information to generate association information that is information in which the vehicle information is associated with the DCM information. The association information is table information or the like that is generated by associating the equipment identification information of the DCM mounted in each of the vehicles 3 with the vehicle identification information (VIN or the like) allocated to each of the vehicles 3 at the time of manufacturing of the vehicles 3. A specific example of the association information will be described below.

The association information storage unit 3113 stores the association information generated by the association information generation unit 3112 in the association information storage unit 3143 shown in FIG. 6.

For example, in a case where ignition-on is detected based on the vehicle information collected by the ECU 32, the association information transmission unit 3114 reads the association information stored in the association information storage unit 3143 and transmits the association information to the center server 5 through the communication module 312 shown in FIG. 6.

The information transmission restriction unit 3115 compares the vehicle identification information (VIN or the like) acquired from CAN data or the like of the vehicle with vehicle identification information of an authorized vehicle associated with the equipment identification information of the DCM 31, in a case where the vehicle identification information acquired from the vehicle does not coincide with the vehicle identification information included in the association information, determines that the DCM 31 is not mounted in the authorized vehicle, and restricts transmission of vehicle status information representing the status of the vehicle to an external device (center server 5). As the information transmission restriction unit 3115 is provided, for example, even though the DCM 31 is replaced or the like in an unauthorized manner, and the DCM 31 other than the authorized DCM 31 is mounted in the authorized vehicle, the vehicle identification information is non-coincident, whereby it is possible to restrict transmission of the vehicle status information or the like to the center server 5. With this, for example, it is possible to restrain the status of the vehicle from being known to a user who is going to use the vehicle in an unauthorized manner.

The information discard unit 3116 compares the vehicle identification information (VIN or the like) acquired from CAN data or the like of the vehicle with the vehicle identification information of the authorized vehicle associated with the equipment identification information of the DCM 31, and in a case where the vehicle identification information acquired from the vehicle does not coincide with the vehicle identification information included in the association information, discards information (remote operation request or the like) transmitted from the portable terminal 4 or the like through the center server 5. As the information discard unit 3116 is provided, for example, even though the DCM 31 is replaced or the like in an unauthorized manner, and the DCM 31 other than the authorized DCM 31 is mounted in the authorized vehicle, a remote operation request transmitted from the portable terminal 4 carried with the user who is going to perform a remote operation of the authorized vehicle is discarded. Thus, an unauthorized use of the vehicle is restrained.

Next, an operation to store the generated association information and an operation to transmit the stored association information to the center server 5 will be described referring to FIG. 8 and the like.

Figure 8:
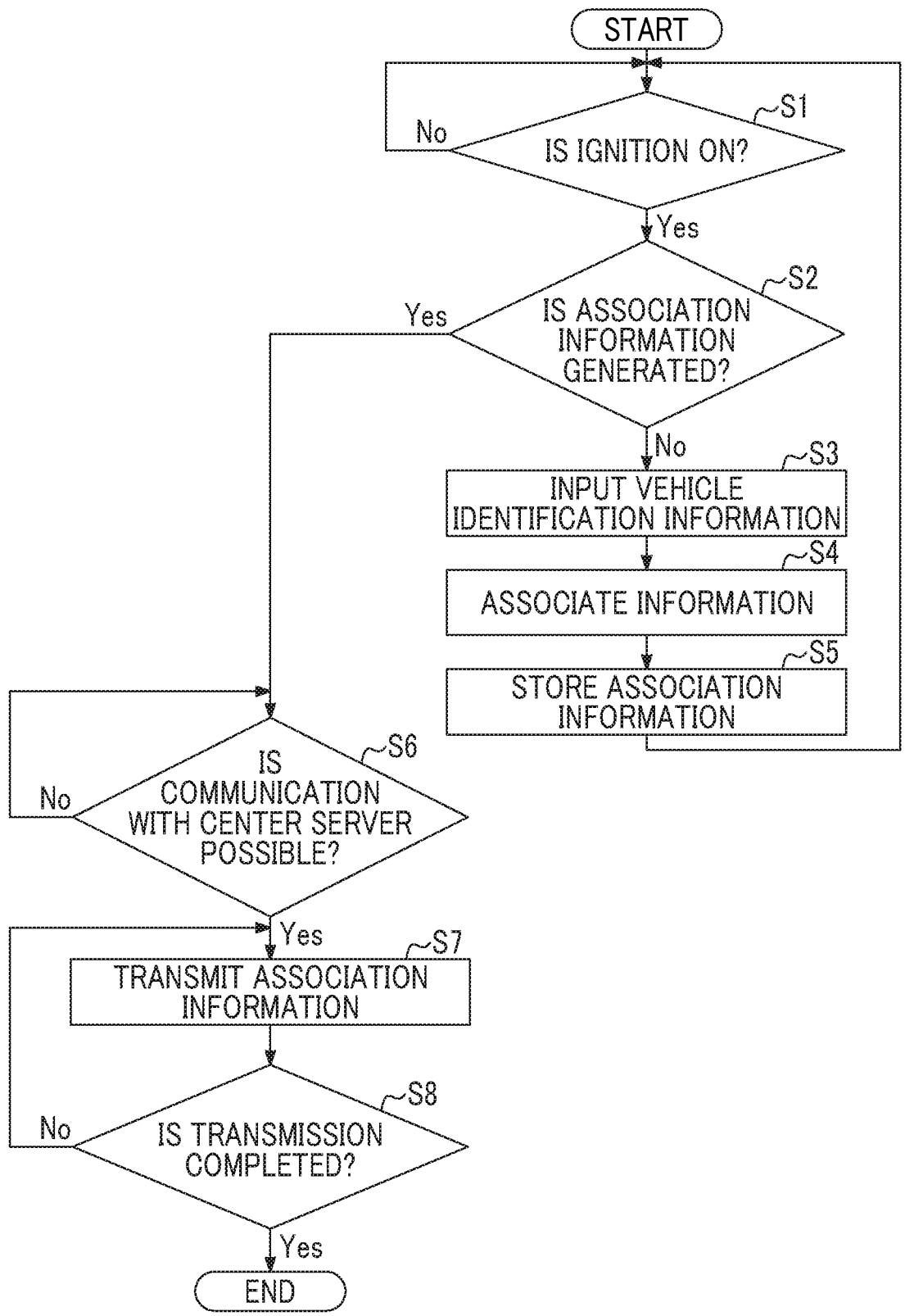
FIG. 8 is a flowchart illustrating a storage operation of association information and a transmission operation of the association information in the DCM 31.
Figure 10:
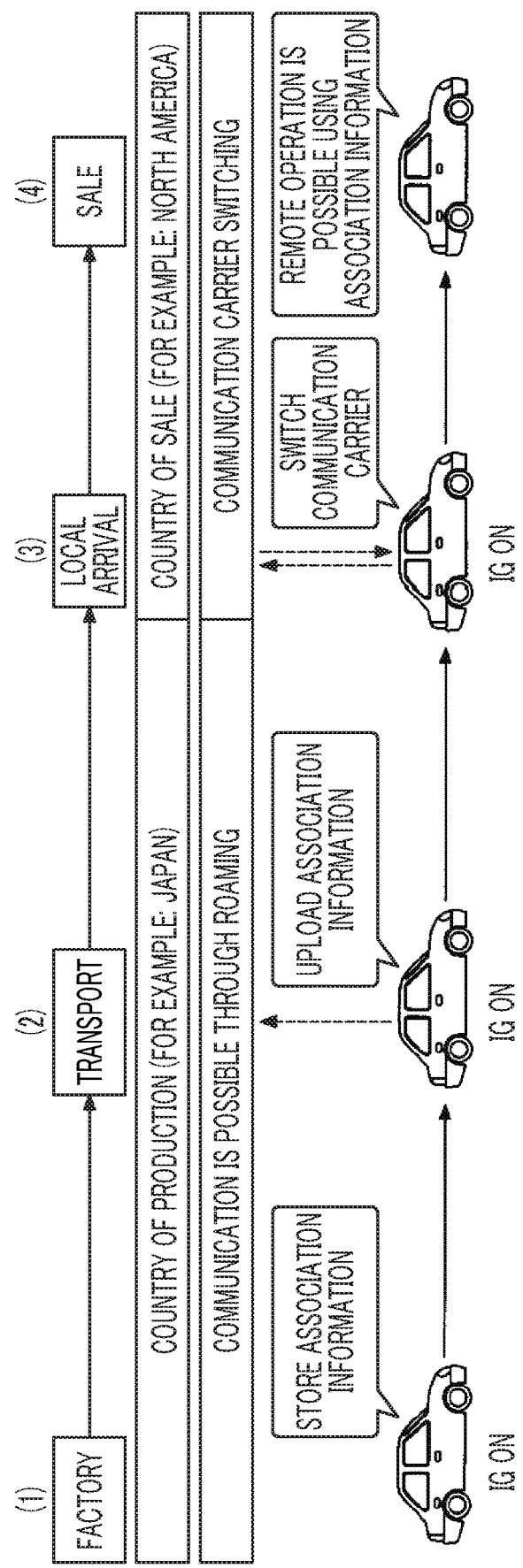

FIG. 8 is a flowchart illustrating a storage operation of the association information and a transmission operation of the association information in the DCM 31. FIG. 9 is a diagram showing an example of the association information. FIG. 10 is a diagram conceptually showing a timing of uploading the association information and the like at the time of manufacturing of a vehicle, at the time of transportation of the vehicle, and the like. FIG. 10 shows a manner in which a vehicle manufactured in a country of production (for example, Japan) is imported to an overseas country of sale (for example, North America), and a communication carrier (mobile network operator) of the country of sale is switched.

At the time of manufacturing of a vehicle, the DCM 31 is shipped from a supply factory of the DCM 31 to a vehicle factory as a manufacturer of an automobile. The DCM 31 at the time of shipment of the supply factory is set to, for example, a "factory mode" in which a chassis number or the like is rewritable. In the vehicle factory in which the DCM 31 is stocked, the DCM 31 is mounted in a vehicle, and configuration data is written in the DCM 31. Configuration data is, for example, a "chassis number", "vehicle type", "fuel type (gasoline, diesel)", "body type", or the like. As an example of the "chassis number", for example, a vehicle identification number "VIN" that is a number for uniquely identifying an individual vehicle is used.

After the DCM 31 is mounted in the vehicle, in a case where ignition-on is detected as shown in (1) of FIG. 10, storage processing of the association information is executed. The storage processing of the association information is processing for storing the association information generated by associating the DCM information with the vehicle identification information in the DCM 31 in a predetermined storage unit. The storage processing of the association information corresponds to processing of Step S1 and Step S2 (No) to Step S5 shown in FIG. 8.

As shown in (2) of FIG. 10, in a case where ignition-on is detected at the time of transportation of the vehicle, transmission processing of the association information is executed. The transmission processing of the association information is processing for transmitting the association information stored in the predetermined storage unit so as to be managed and shared by the center server 5. The transmission processing of the association information corresponds to Step S1 and Step S2 (Yes) to Step S8.

In Step S1, the association information generation unit 3112 determines whether or not ignition-on is detected. The processing of Step S1 is repeated until ignition-on is detected (Step S1, No).

In a case where ignition-on is detected (Step S1, Yes), the association information generation unit 3112 determines whether or not the association information is generated with reference to the association information storage unit 3143 (Step S2).

In a case where the association information is not stored in the association information storage unit 3143 (Step S2, No), the association information generation unit 3112 determines that the association information is not generated, and input the vehicle identification information (VIN or the like) through the information input unit 3111 (Step S3).

The association information generation unit 3112 associates the vehicle identification information input in Step S3 with the DCM information to generate the association information (Step S4).

The association information storage unit 3113 stores the association information generated in Step S4 in the association information storage unit 3143 (Step S5). With this, the storage processing of the association information ends.

FIG. 9 shows an example of association information 2. "VIN" is an example of the vehicle identification number. "DCM Model Year", "DCM Destination", "DCM Part Number", "DCM Supplier", "DCM Grade", and the like are an example of the equipment identification information (DCM information).

"eUICCID" included in the association information 2 is an identification number for uniquely identifying "eUICC". "eUICC" is a secure element (a storage medium in which a communication protocol is stored), called an embedded subscriber identity module (e-SIM). "eUICC" is designed such that contracts with a plurality of mobile network operators can be managed remotely in conformity with the specification of GSMA, and is mounted (embedded) in a substrate or the like constituting the DCM 31 in an unremovable manner. As "eUICC" is provided, even though a country of production and a country of sale of the vehicle are different, communication between the center server 5 and the vehicle becomes possible through a communication network provided by a mobile network operator of each country.

After the association information is stored in the association information storage unit 3143, for example, in a case where ignition-on for transportation of the vehicle is detected (Step S1, Yes), the association information generation unit 3112 determines whether or not the association information is generated with reference to the association information storage unit 3143 (Step S2, Yes).

In a case where determination is made that the association information is generated, processing of Step S6 is executed.

In Step S6, the communication module 312 of the DCM 31 measures the field intensity of the communication network NW1 and compares a value of the measured field intensity with a predetermined threshold value to determine whether or not the vehicle is within an area where communication with the communication network NW1 is possible. The processing of Step S6 may be started in a case where determination is made in Step S2 that the association information is generated or may be executed in parallel with the processing of Steps S1 and S2.

In a case where the vehicle is not within the area where communication with the communication network NW1 is possible, the communication module 312 determines that communication with the center server 5 is difficult (Step S6, No), and repeats the processing of Step S6 until determination is made that the vehicle is within the area where communication is possible.

In a case where the vehicle is within the area where communication with the communication network NW1 is possible, the communication module 312 determines that communication with the center server 5 is possible (Step S6, Yes).

The center server 5 that determines that communication with the communication module 312 is possible inputs, to the association information transmission unit 3114, information indicating that communication is possible. The association information transmission unit 3114 that inputs the above-described information reads the association information stored in the association information storage unit 3143 and transmits (uploads) the association information to the center server 5 (Step S7).

In the association information transmission unit 3114, the processing of Step S8 is executed (Step S8, No) until a reception completion notification of the association information is received from the center server 5. In a case where the association information transmission unit 3114 receives the reception completion notification (Step S8, Yes), the transmission processing of the association information ends.

As the transmission processing of the association information ends, for example, as shown in (3) of FIG. 10, in a case where the vehicle is imported from Japan to North America, switching to a communication carrier (mobile network operator) of North America is performed. As described above, since "eUICC" is mounted in the DCM 31, for example, it is possible to perform roaming with a communication carrier of the country of production, and to enable connection to an authorized communication carrier in the country of sale.

In a state in which switching of the communication carrier is performed, in a case where the vehicle is sold as shown in (4) of FIG. 10, a remote operation of the vehicle can be performed with the portable terminal 4 carried with the user of the vehicle.

Communication between the DCM 31 and the communication carrier is encrypted by, for example, common key system encryption processing, such as Transport Layer Security (TLS). It is desirable files to be transmitted in this case are encrypted by the DCM information.

Figure 11:
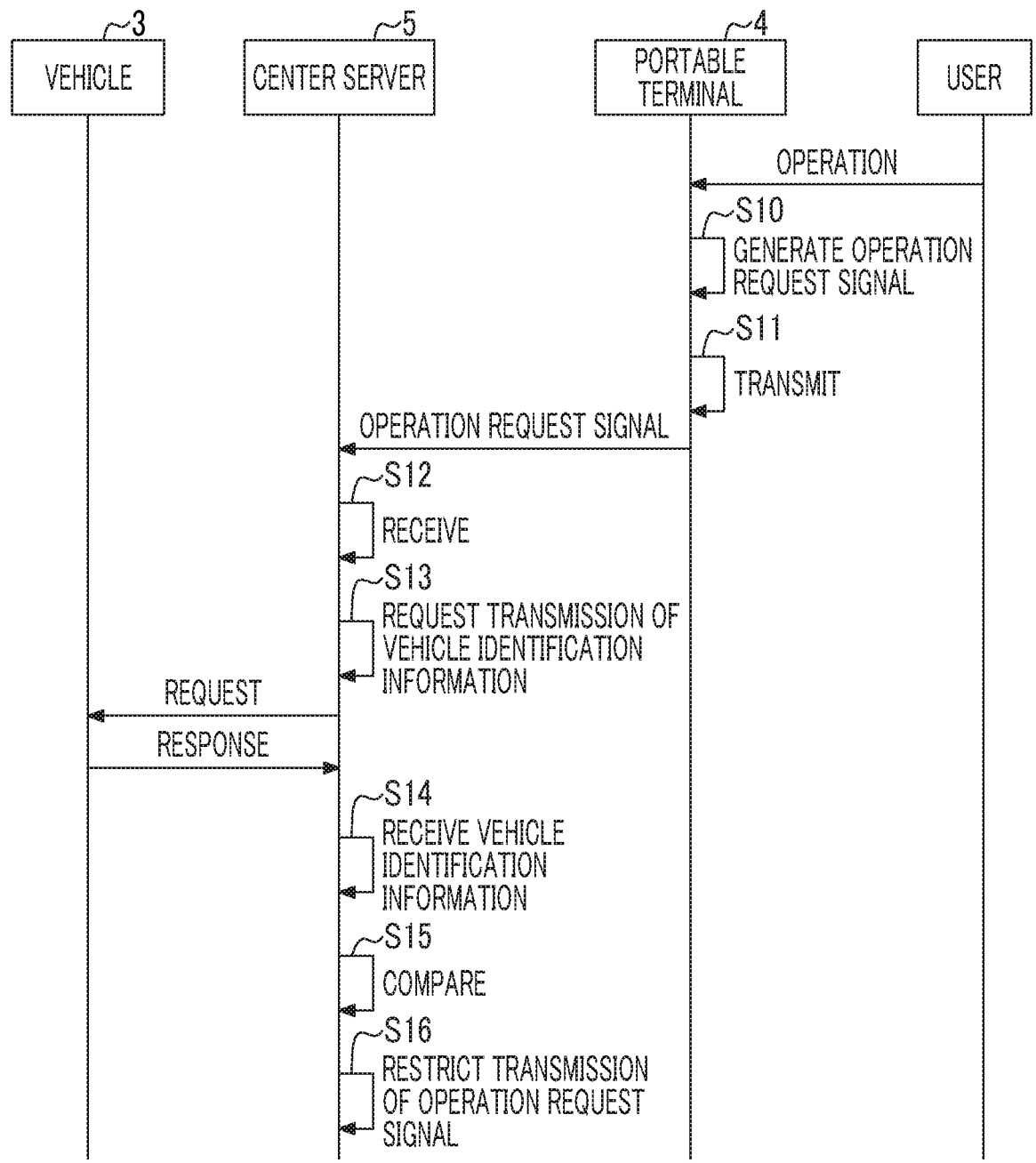
FIG. 11 is a flowchart illustrating a processing operation to determine permission or prohibition of a remote operation of the vehicle after the association information is set.

FIG. 11 is a flowchart illustrating a processing operation to determine whether or not a remote operation of a vehicle is to be performed after the association information is set.

In a case where the user starts the dedicated application of the portable terminal and operates an icon or the like displayed on a screen after start, and an operation to start an engine is performed remotely, the operation request signal is generated (Step S10), and the operation request signal is transmitted to the center server 5 (Step S11).

In information to be transmitted to the center server 5, for example, user identification information for identifying the user of the portable terminal 4, or the like is included, in addition to the operation request signal. In Step S12, the association information management unit 5212 of the center server 5 that receives the operation request signal, the user identification information, and the like determines whether or not the vehicle to be a target of a remote operation coincides with a vehicle recorded in the association information with reference to the association information stored in the association information DB 520J.

For example, information (the user identification information, the identification information of the portable terminal 4, or the like) relating to an owner of the vehicle when the vehicle is purchased in a dealer is uploaded from the dealer to the center server 5, whereby the association information management unit 5212 can manage the input user identification information and the identification information of the vehicle owned by the user. As the user identification information and the like are input using the dedicated application of the portable terminal 4, information may be uploaded to the center server 5, and the association information management unit 5212 may manage the user identification information and the like. In a case where the remote operation request, the user identification information, and the like are input from the portable terminal 4 at the time of the remote operation of the vehicle, the association information management unit 5212 collates the input information with information managed in advance, thereby being able to specify the portable terminal 4 as a transmission source of the remote operation request or the user of the portable terminal 4.

In a case where the user can be specified in this way, since the vehicle (that is, the vehicle to be a target of a remote operation) owned by the user can be specified, the association information management unit 5212 requests the specified vehicle to transmit the VIN (vehicle identification information) (Step S13), and receives the vehicle identification information with respect to the request (Step S14).

The association information management unit 5212 compares the received vehicle identification information with the vehicle identification information of the association information recorded in advance in the center server 5 (Step S15).

As a result of comparison, in a case where the vehicle identification information is non-coincident, the association information management unit 5212 determines that the DCM 31 is not mounted in the authorized vehicle, and restricts transmission of the operation request signal to the vehicle (Step S16). With this, an unauthorized use of the authorized vehicle, for example, an engine start, door unlocking, or the like is restrained.

In a case where the vehicle identification information is non-coincident, transmission of the operation request signal to the vehicle may be restricted, and for example, alarm information that is information for giving an alarm or a warning indicating a state of being used in an unauthorized manner may be generated and the alarm information may be distributed to the portable terminal 4 carried with the user of the authorized vehicle. With this, a state in which the authorized vehicle may be used in an unauthorized manner can be known.

As a result of comparison, in a case where the vehicle identification information is coincidence, the association information management unit 5212 transmits the operation request signal to the vehicle to be a target of a remote operation. With this, a predetermined operation is performed.

In the configuration, as the processing device 52 of the center server 5 includes the vehicle identification information of the authorized vehicle to be associated with the DCM information in transmission data to the DCM 31, the vehicle may determine whether or not transmission data is directed toward the host vehicle. With this, it is possible to suppress a situation in which the DCM 31 is replaced in another vehicle different from the authorized vehicle or the like, and vehicle information of the other vehicle is uploaded to the processing device 52 of the center server 5 or a remote operation of the other vehicle is allowed.

As described above, the information processing device according to the embodiment is an information processing device (DCM 31) that is provided in a vehicle mounted with communication equipment (communication module 312) or an information processing device (processing device 52) that is provided in an external device (center server 5) configured to perform communication with the communication equipment (communication module 312), and includes a storage unit configured to store association information in which equipment identification information unique to the communication equipment and vehicle identification information unique to the authorized vehicle mounted with the communication equipment are associated.

With the configuration, for example, as determination is made whether the vehicle identification information acquired from CAN data of the vehicle or the like coincides with the vehicle identification information included in the stored association information using the association information stored in the predetermined storage unit, it is possible to specify the authorized vehicle mounted with the communication equipment. In a case where it is not possible to specify the authorized vehicle mounted with the communication equipment, there is a probability that a situation in which the communication equipment is not mounted in the authorized vehicle occurs. Thus, it is possible to take measures for restraining an unauthorized use of the authorized vehicle with respect to the remote operation request or the like.

An information processing program according to the embodiment causes a computer to execute a step of making a storage unit of an information processing device, which is provided in a vehicle mounted with communication equipment or is provided in an external device configured to perform communication with the communication equipment, store association information in which equipment identification information unique to the communication equipment and vehicle identification information unique to the authorized vehicle mounted with the communication equipment are associated. With this, it is possible to restrain an unauthorized use of the authorized vehicle with respect to an unauthorized remote operation request or the like without making significant improvements to the center server 5 or the DCM 31.

The configurations of the above-described embodiment are merely examples of the disclosure, and may be combined with other known techniques. The configurations may be partially omitted or changed without departing from the spirit and scope of the disclosure.

What is claimed is:

1. An information processing device that is provided in a vehicle mounted with communication equipment, the information processing device comprising a storage unit,
  wherein the storage unit is configured to store association information in which equipment identification information unique to the communication equipment and vehicle identification information unique to an authorized vehicle mounted with the communication equipment are associated, and
  the information processing device further comprises an information transmission restriction unit configured to compare vehicle identification information acquired from the vehicle with the vehicle identification information included in the association information, and in a case where the vehicle identification information acquired from the vehicle does not coincide with the vehicle identification information included in the association information, restrict transmission of vehicle status information representing a status of the vehicle to an external device configured to perform communication with the communication equipment.

2. The information processing device according to claim 1, further comprising an information discard unit configured to compare vehicle identification information acquired from the vehicle with the vehicle identification information included in the association information, and in a case where the vehicle identification information acquired from the vehicle does not coincide with the vehicle identification information included in the association information, discard information transmitted from the external device.

3. A non-transitory computer readable medium storing an information processing program causing a computer to execute
  a step of making a storage unit of an information processing device, which is provided in a vehicle mounted with communication equipment, store association information in which equipment identification information unique to the communication equipment and vehicle identification information unique to an authorized vehicle mounted with the communication equipment are associated, and
  a step of making an information transmission restriction unit of the information processing device
    compare vehicle identification information acquired from the vehicle with the vehicle identification information included in the association information, and
    in a case where the vehicle identification information acquired from the vehicle does not coincide with the vehicle identification information included in the association information, restrict transmission of vehicle status information representing a status of the vehicle to an external device configured to perform communication with the communication equipment.

4. An information processing device that is provided in a vehicle mounted with communication equipment, the information processing device comprising a storage unit,
  wherein the storage unit is configured to store association information in which equipment identification information unique to the communication equipment and vehicle identification information unique to an authorized vehicle mounted with the communication equipment are associated, and
  the information processing device further comprises an information discard unit configured to compare vehicle identification information acquired from the vehicle with the vehicle identification information included in the association information, and in a case where the vehicle identification information acquired from the vehicle does not coincide with the vehicle identification information included in the association information, discard information transmitted from an external device configured to perform communication with the communication equipment.

5. A non-transitory computer readable medium storing an information processing program causing a computer to execute
  a step of making a storage unit of an information processing device, which is provided in a vehicle mounted with communication equipment, store association information in which equipment identification information unique to the communication equipment and vehicle identification information unique to an authorized vehicle mounted with the communication equipment are associated, and
  a step of making an information discard unit of the information processing device
    compare vehicle identification information acquired from the vehicle with the vehicle identification information included in the association information, and
    in a case where the vehicle identification information acquired from the vehicle does not coincide with the vehicle identification information included in the association information, discard information transmitted from an external device configured to perform communication with the communication equipment.

* * * * *